United States Patent [19]

Hehl

[11] 4,418,845

[45] Dec. 6, 1983

[54] GRANULATE HOPPER FOR HORIZONTALLY AND VERTICALLY INJECTING INJECTION MOLDING MACHINES

[76] Inventor: Karl Hehl, Arthur-Hehl-Strasse 32, 7298 Lossburg 1, Fed. Rep. of Germany

[21] Appl. No.: 329,068

[22] Filed: Dec. 9, 1981

[30] Foreign Application Priority Data

Dec. 9, 1980 [DE] Fed. Rep. of Germany ....... 3046387

[51] Int. Cl.³ .......................... B29B 5/02; B67C 9/00
[52] U.S. Cl. .................................. 222/162; 222/185; 222/383; 222/482
[58] Field of Search .................... 285/155, 181, 184; 138/44, 9; 425/580, 582; 222/160, 162, 164, 173, 174, 325, 317, 383, 413

[56] References Cited

U.S. PATENT DOCUMENTS

| 1,390,976 | 9/1921 | Banbury ............................ 222/410 |
| 4,067,353 | 1/1978 | DeHoff ............................. 138/92 X |
| 4,144,012 | 3/1979 | Pinkley ........................... 425/580 X |
| 4,251,204 | 2/1981 | Hehl ................................... 425/582 |
| 4,266,694 | 5/1981 | Hehl ................................... 222/167 |

FOREIGN PATENT DOCUMENTS 2847980  5/1980  Fed. Rep. of Germany ...... 425/582

*Primary Examiner*—David A. Scherbel
*Attorney, Agent, or Firm*—Joseph A. Geiger

[57] ABSTRACT

A mounting structure for the support of a granulate hopper on the injection unit of an injection molding machine by means of which the hopper can be selectively attached to a horizontally oriented injection unit and a vertically oriented injection unit, the structure comprising a vertical primary charge chute and an inclined secondary charge chute leading into the plastification cylinder, and a direct attachment of the hopper base formation to a primary horizontal mounting face of a horizontally oriented injection unit, or an attachment of the same hopper formation to the horizontal upper face of an inclined hollow adapter post aligned with the secondary charge chute of a vertically oriented injection unit. To the hopper is clamped a hopper base which is slidable on a transferrable horizontal guide plate.

10 Claims, 5 Drawing Figures

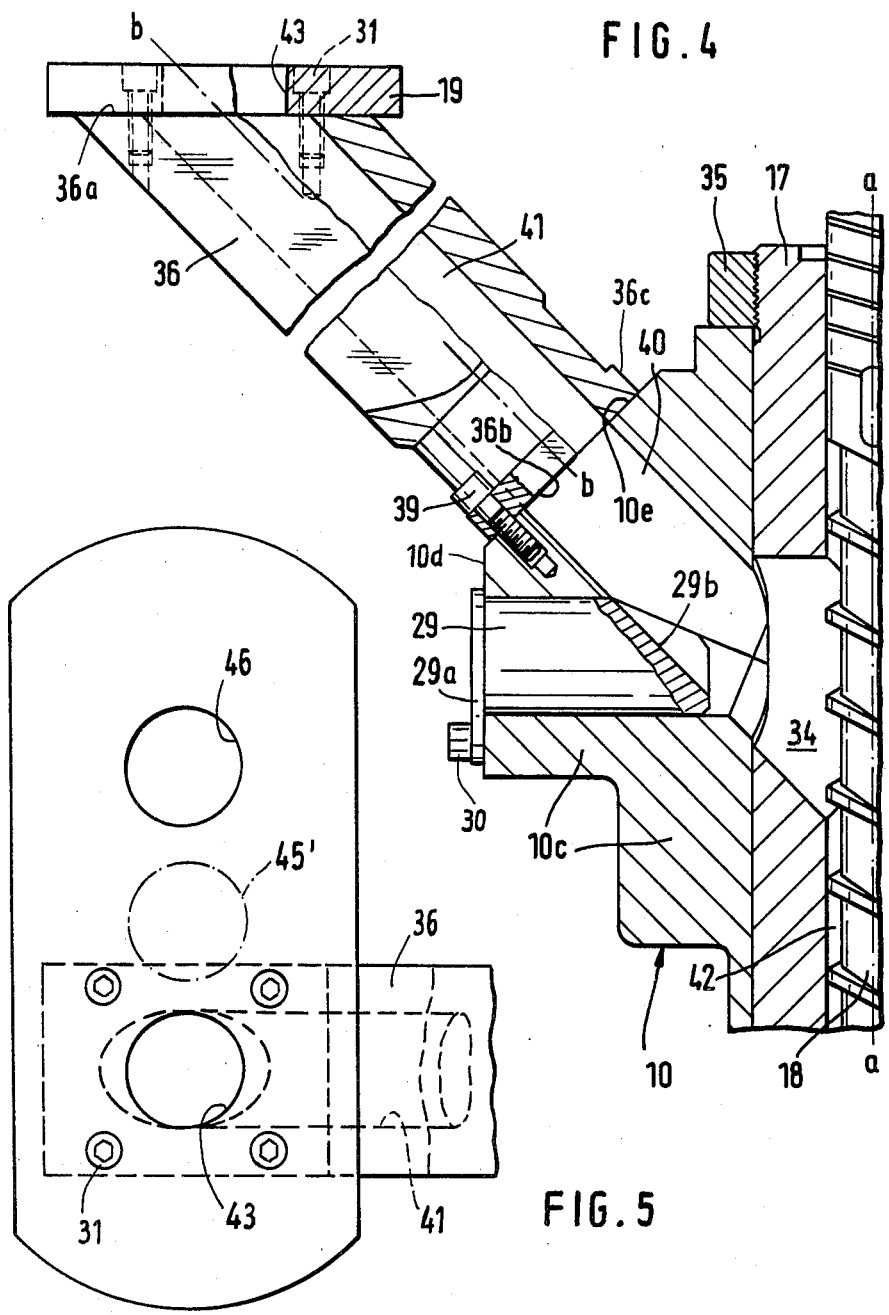

GRANULATE HOPPER FOR HORIZONTALLY AND VERTICALLY INJECTING INJECTION MOLDING MACHINES

BACKGROUND OF THE INVENTION

1. Field of the Invention

The present invention relates to injection molding machines and, more particularly, to a supporting structure for a granulate hopper on the injection unit of an injection molding machine by means of which the hopper can be selectively attached to a horizontally oriented injection unit and a vertically oriented injection unit.

2. Description of the Prior Art

When the normally horizontally oriented injection unit of an injection molding machine is to be oriented for vertical injection, the hopper which feeds raw material to its plastification cylinder must be reoriented so as to be vertical, or near vertical, for a reliable gravity-flow of the granulate into the injection unit. In order to accomplish this result, it has previously been suggested to arrange the charge chute which leads into the plastification cylinder at an angle of 45 degrees and to attach to it an asymmetrical hopper whose outlet opening is likewise inclined at 45 degrees. By rotating the hopper at its connection to the charge chute 180 degrees, it is possible to obtain a configuration for horizontal injection in which the hopper axis is perpendicular to the injection axis and a configuration for vertical injection in which the hopper axis is parallel to the injection axis. Such a structure is suggested in German Pat. No. 11 50 192.

A different solution is suggested in the German Auslegeschrift (Publ. Allowed Application) No. 28 34 203 and in the corresponding U.S. Pat. No. 4,266,694. They disclose a hopper mounting structure with a mounting hub on the injection unit with an inwardly diverging channel opening and an inclined mounting face, so that it becomes possible, with the aid of two rotatable connectors with oblique end faces, to create, for horizontal injection, a flow channel which is perpendicular to the injection axis and, for vertical injection, a flow channel which is inclined at 45 degrees. The raw material hopper is again asymmetrical, having an inclined outlet. This mounting structure makes it possible to obtain a straight vertical flow direction in the horizontal orientation of the injection unit and a 45-degree inclined flow direction in the vertical orientation of the injection unit.

A major shortcoming of these prior art hopper arrangements is their need for an asymmetrical hopper assembly whose center of gravity is offset from the hopper supporting structure, so that the latter is subjected to stress and fatigue from the weight of the hopper contents. This condition limits the hopper capacity. The lack of symmetry of the hopper itself also precludes the use of a rotary granulate agitator inside the hopper. The latter may be necessary for poorly flowing types of plastic granulate.

Still another possibility of a vertical injection configuration is suggested in the German Offenlegungsschrift (Publ. Application) No. 29 20 584 and in the corresponding U.S. Pat. No. 4,251,204. The arrangement suggested in these publications involves the use of a horizontal connecting cylinder with a driven feeding device.

SUMMARY OF THE INVENTION

Underlying the present invention is the primary objective of devising an improved mounting structure for the granulate hopper which provides convertibility of the hopper attachment for use with both horizontally and vertically oriented injection units, whereby the flow direction of the granulate is vertical in the horizontal injection mode and inclined at approximately 45 degrees in the vertical injection mode, while the granulate hopper itself is symmetrical, preferably a body of rotation.

The present invention proposes to attain these objectives by suggesting an improved mounting structure for a granulate hopper which features a mounting hub on the carrier bridge of the injection unit with two mounting faces, the primary mounting face being horizontal and surrounding a vertical charge chute, the secondary mounting face being arranged behind the primary mounting face and inclined at an acute angle thereto, surrounding a secondary charge chute which is similarly inclined.

To the secondary mounting face is attachable a hollow adapter post which forms an inclined adapter chute in alignment with the inclined charge chute and which has an upper attachment face which is oriented perpendicularly to the injection axis. The hopper assembly is thus selectively attachable to the primary mounting face, in a horizontal injection configuration of the injection unit, and to the upper attachment face of the inclined adapter post, in a vertical injection configuration of the injection unit.

In a preferred embodiment of the invention, the secondary charge chute and the adapter post are inclined at an angle of 45 degrees, the secondary mounting face on the mounting hub extending perpendicularly thereto. The primary and secondary charge chutes are preferably so arranged that they form a chute junction at the entrance to the plastification cylinder, the latter having a matchingly aligned entry taper with a vertical rear outline and an inclined front outline.

The present invention further suggests the combination of the proposed selective attachment capability of the hopper with a hopper supporting structure which provides a lateral mobility of the hopper assembly, away from its charge chute. For this purpose, the invention suggests a transversely extending horizontal guide plate which can be attached to the primary mounting face or to the upper attachment face of the adapter post. The hopper assembly has a hopper base which forms a guided engagement with the guide plate.

A clamping screw with an attached clamping lever provides a convenient means for manually securing the hopper in any desired position on the guide plate. A second opening in the guide plate, located at a lateral distance from the charge chute, serves as a hopper discharge opening, so that the hopper can be emptied of its contents, without removing it from the injection unit. The discharge opening is preferably spaced such a distance from the charge unit that, when the hopper is placed half-way therebetween, its bottom opening is closed off by the guide plate.

The hopper assembly preferably includes a tapered supporting collar on the hopper base in engagement with the conical lower section of the hopper, as well as a recessed hopper extension at the lower extremity of the latter. On the inside of the hopper assembly is arranged a clamping bell which forms a continuation of the hopper cone, while clamping the hopper extension against the hopper base.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows:

FIG. 4 shows the hopper mounting structure of FIG. 3 in an enlarged elevational cross section; and FIG. 5 shows portions of the structure of FIG. 4 in a plan view.

DESCRIPTION OF THE PREFERRED EMBODIMENT

Figure 1:
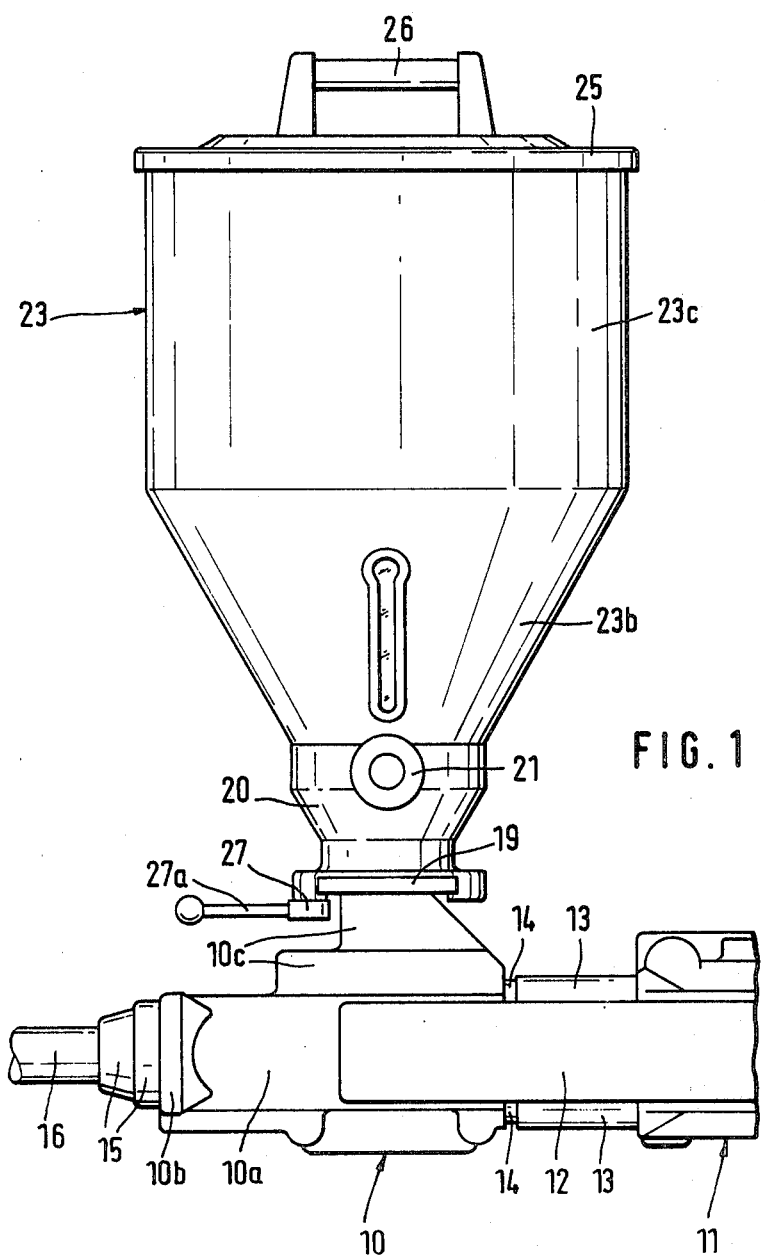
FIG. 1 shows, in an elevational view, portions of an injection unit which carries a granulate hopper in a horizontal injection configuration, using the hopper mounting structure of the present invention.
Figure 2:
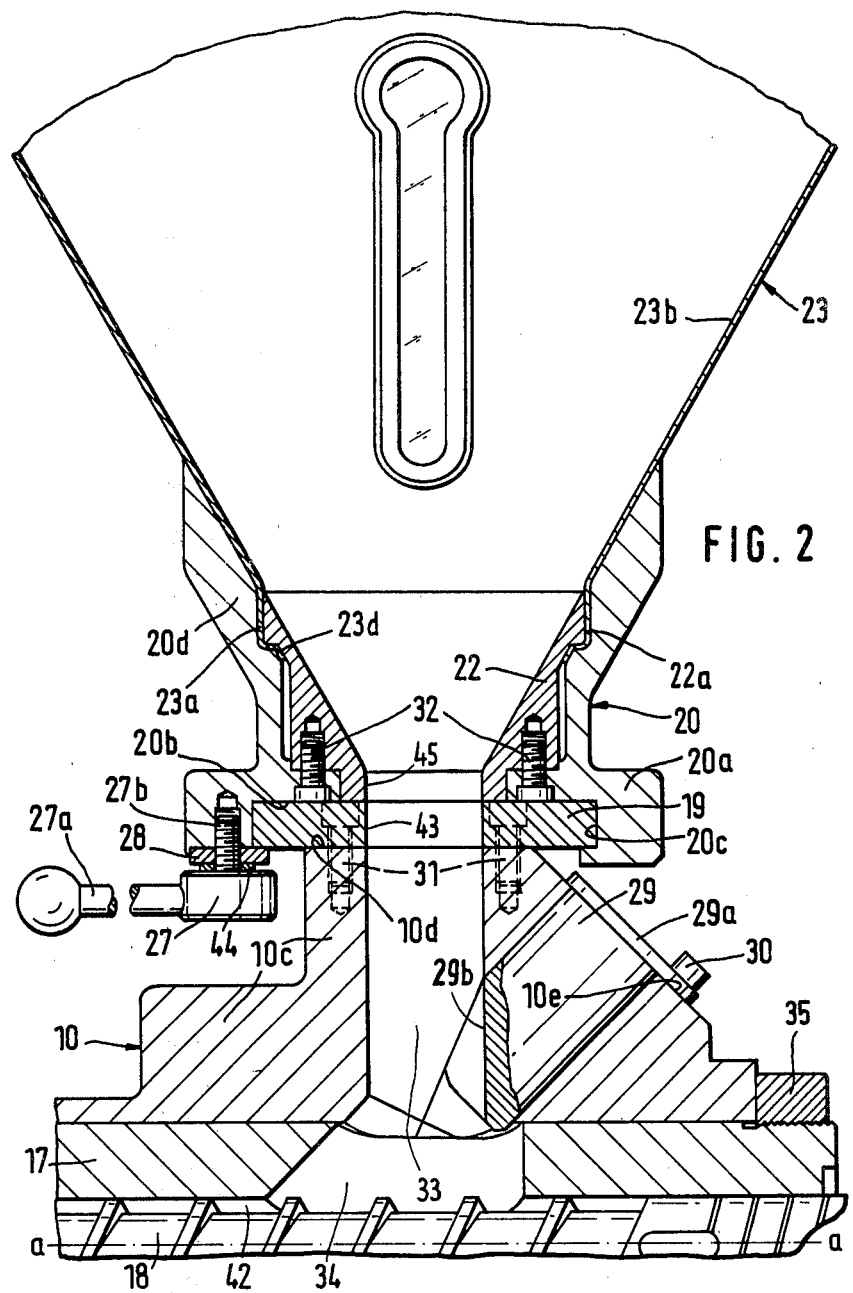
FIG. 2 shows the hopper mounting structure of FIG. 1 in an enlarged elevational cross section.
Figure 3:
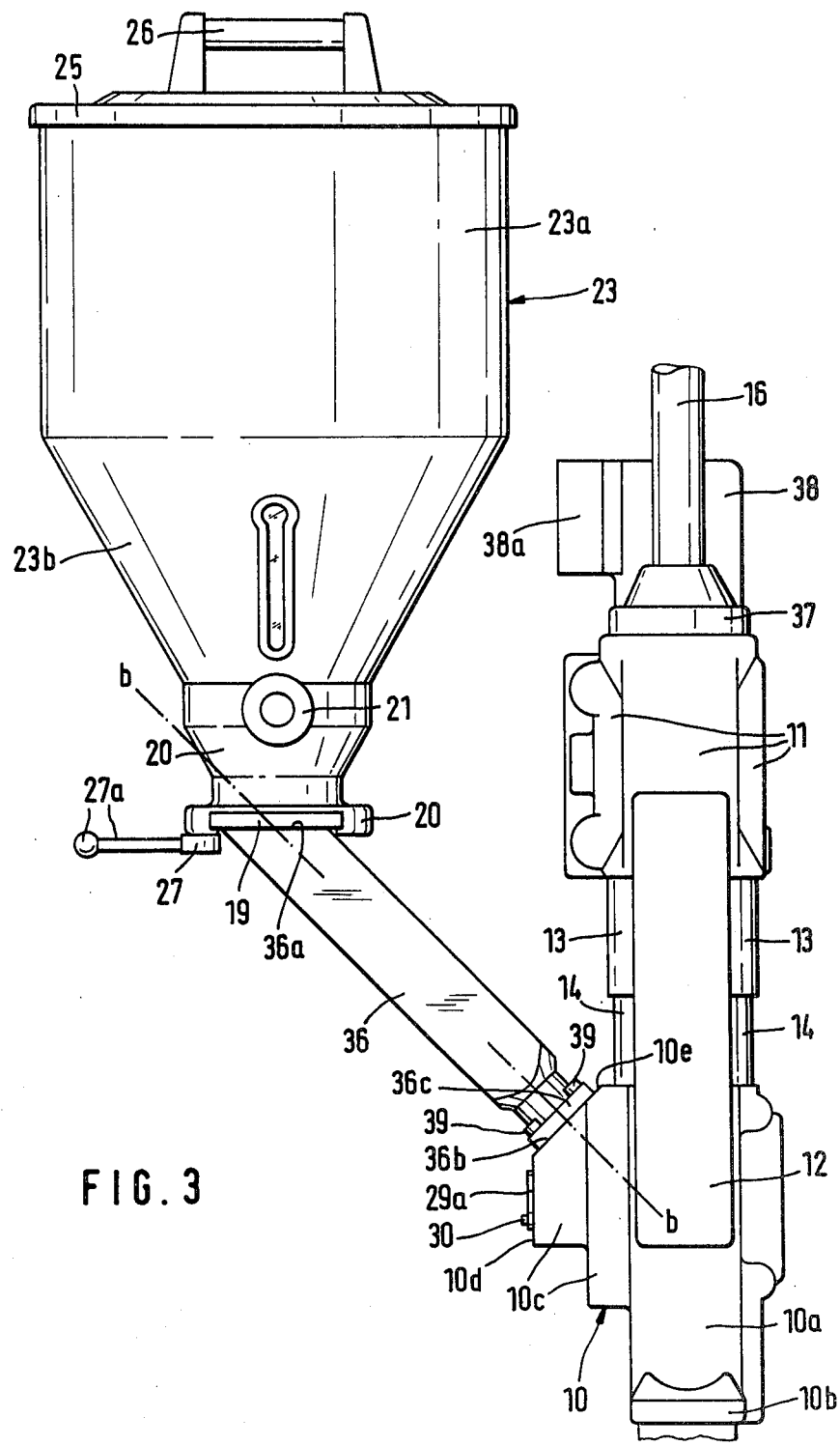
FIG. 3 shows the injection unit of FIG. 1 with the hopper and hopper mounting structure of the invention arranged in a vertical injection configuration.

The drawings show an injection unit which may be oriented horizontally, as shown in FIG. 1, or vertically, as shown in FIG. 3, for horizontal or vertical injection, respectively. This known injection unit includes two parallel guide rods 16 which carry an axially displaceable first carrier bridge 10 and a likewise axially displaceable second carrier bridge 11. In the center of the first carrier bridge 10 is mounted a plastification cylinder 17 (FIG. 2) which extends centrally between, and parallel to the guide rods 16, being secured in a central horizontal bore of the carrier bridge 10 by means of a nut 35.

In the bore of the plastification cylinder 17 is arranged a plastification screw 18 which is rotatable as well as axially displaceable relative to the plastification cylinder, for plastification of the raw material and subsequent injection in an axial injection stroke. This injection stroke is produced by an axial movement of the second carrier bridge 11 which also carries a hydraulic drive motor 38 (FIG. 3) to which the plastification screw is coupled. FIG. 3 also shows a hydraulic connection block 38a for the motor 38 and a cylinder end cover 37 at the carrier bridge 11 which is part of a hydraulic actuator assembly that drives the carrier bridge 11. Also forming part of this hydraulic actuator assembly are two telescopic cover members 13 and 14 which surround connecting members between the two carrier bridges 10 and 11. At 12 is arranged a displacement measuring device which produces displacement-related movement control signals.

The first carrier bridge 10 forms a pair of hydraulic cylinder assemblies 10a with the two guide rods 16 by means of which both carrier bridges are movable simultaneously, in order to approach and retract the injection unit in relation to the injection molding die (not shown). The cylinder assemblies 10a have end covers 15 at their forward extremities.

As can be seen in FIG. 1, the granulate hopper 23 has a cylindrical upper hopper section 23c which adjoins a conical lower hopper section 23b. A hopper lid 25 with a handle 26 sits on the hopper opening. The hopper walls are preferably of steel sheet. FIG. 2 shows the hopper assembly to be arranged vertically above a mounting hub 10c of the first carrier bridge 10, in alignment with a vertical bore through the mounting hub which serves as a primary charge chute 33, leading through an entry taper 34 of the plastification cylinder 17 into the plastification space 42.

Supporting the hopper assembly on the mounting hub 10c is a horizontal mounting face 10d which surrounds the vertical charge chute 33. A generally rectangular guide plate 19 is attached to the mounting face 10d by means of bolts 31. The guide plate 19 extends horizontally in a transverse direction to the plastification cylinder 17. The longitudinal edges of the guide plate 19 are engaged by the base flange 20a of a hopper base 20 which is attached to the conical lower section 23b of the hopper 23.

The attachment between the lower hopper section 23b and the hopper base 20 is accomplished by means of an outwardly recessed hopper extension 23a at the lower extremity of the conical hopper section 23b, the hopper extension 23a consisting essentially of a short cylindrical wall portion and a radially inwardly extending flange portion 23d. Fitting into the recess of the hopper extension 23a is a clamping collar 22a of a clamping bell 22 which has a conical central opening in alignment with the cone of the lower hopper section 23b and ending in a short cylindrical bell mouth 45.

The hopper base 20 has a supporting collar 20d with a conical surface engaging the lower end portion of the conical hopper section 23b and a recess matching the cylindrical and radial portions of the hopper extension 23a, so that a stable clamping connection is obtained between the hopper 23 and the hopper base 20, when the clamping bell 22 is pulled downwardly by tightening the bolts 32. An excellent clamping connection, which is satisfactory even for a very heavy hopper of large capacity, is obtained when both the clamping bell 22 and the hopper base 20 are machined parts. This clamping configuration is the subject of my companion application Ser. No. 329,067 filed Dec. 9, 1981. The bell mouth 45 which serves as the discharge opening for the hopper assembly has the same diameter as the central bore 43 of the guide plate 19 and the charge chute 33 in the mounting hub 10c, the three bore portions thus forming a continuous vertical chute.

The guide plate 19 is also shown in FIGS. 4 and 5, as attached to the upper mounting face of an adapted post 36, in the vertical configuration of the injection unit, which will be described further below. However, as can be seen from FIG. 5, the guide plate 19 has a discharge opening 46 arranged at a distance from its central bore 43, the hopper assembly being movable along the guide plate 19 into alignment with the discharge opening 46, for discharge of the hopper contents. A stippled circle 45' indicates an intermediate hopper position in which the hopper discharge opening is closed off by the guide plate 19. The hopper base 20 carries two knobs 21 by means of which the hopper assembly can be moved along the guide plate 19.

In order to secure the hopper assembly in relation to the guide plate 19, the hopper base 20 is equipped with a clamping device which consists essentially of a clamping screw 27 engaging the flange portion 20a of the hopper base 20 from below with a threaded shaft 27b. A clamping lever 27a which is attached to the clamping screw 27 serves to tighten the latter, so that a clamping action is obtained between an intermediate pressure disc 28 and the lower edge portion of the guide plate 19, while the opposite edge portion of the pressure disc 28 abuts against a recessed face of the base flange 20a. A shim washer 44 is interposed between the pressure disc 28 and the head of the clamping screw 27 for the adjustment of the angular position of the clamping lever 27a.

The vertical injection configuration of the injection unit is shown in FIGS. 3 and 4. For this configuration, it is necessary to reorient the hopper assembly into a position in which the hopper axis is parallel to the axis of the plastification cylinder, rather than perpendicular thereto, as is the case in the horizontal injection configuration. As can best be seen in FIG. 4, the hopper mounting structure of the present invention makes this possible by suggesting a secondary charge chute 40 in the mounting hub 10c of the injection unit, arranged at an angle of 45 degrees to the primary charge chute 33. Surrounding the secondary charge chute 40 is a secondary mounting face 10e which is likewise inclined by an angle of 45 degrees.

A hollow adapter post 36 is attached to the inclined mounting face 10e by means of four bolts 39. The adapter post 36 has a square cross-sectional circumference, with a straight bore forming an adapter chute 41 in alignment with the secondary charge chute 40. A neck formation near the lower extremity of the adapter post 36 forms a flange portion 36c for engagement by the bolts 39.

The hollow adapter post 36 thus extends upwardly and outwardly at an angle of 45 degrees, having a perpendicular lower attachment face 36b. On its opposite extremity, the adapter post 36 has an upper attachment face 36a which is inclined at an angle of 45 degrees, thereby forming a horizontal support for the guide plate 19. The latter, in turn carries the hopper assembly in a vertical orientation, unchanged from the arrangement of FIG. 2 for horizontal injection.

The primary charge chute 33 and the secondary charge chute 40 are straight bores of identical diameter, forming a bore junction just above the entry taper 34 of the plastification cylinder 17. The center of this bore junction is preferably located at the interface between the mounting hub 10c and the plastification cylinder 17. For a smooth granulate flow, the entry taper 34 has a rounded radially oriented rear side and a likewise rounded, but inclined front side, in approximate alignment with the front outline of the secondary charge chute 40.

Lastly, the invention suggests a simple way of closing the unoccupied charge chute by means of a chute plug 29 of a diameter which matches the diameter of the charge chutes. A screw 30, clamping an end flange 29a of the chute plug 29, holds the latter in place. By arranging for the primary and secondary mounting faces 10d and 10e to be spaced at the same distance from the charge chute junction, and by providing an approximately inclined gouge 29b in the lower end portion of the chute plug 29, it is possible to continue the wall of the other charge chute, as if the unused charge chute did not exist. The gouge 29b of the chute plug 29 produces the same result, when transferred to the other charge chute and rotated by one-half turn.

Accordingly, a conversion of an injection unit equipped with the hopper mounting structure of the invention from the horizontal injection configuraton to the vertical injection configuration requires the transfer of the guide plate 19 and its four attachment bolts 31 from the primary mounting face 10d of the mounting hub 10c to the upper attachment face 36a of the adapter post 36, the transfer of the chute plug 29 from the secondary charge chute 40 to the primary charge chute 33, and the attachment of the adapter post 36 by its lower attachment face 36b to the secondary mounting face 10e of the mounting hub 10c. In both injection configurations, the granulate hopper is oriented vertically, and its support on the guide plate 19 is not subjected to any tilting forces. This hopper mounting structure, therefore, is ideally suited for large-capacity hoppers of symmetrical, especially rotational, construction.

It should be understood, of course, that the foregoing disclosure describes only a preferred embodiment of the invention and that it is intended to cover all changes and modifications of this example of the invention which fall within the scope of the appended claims.

I claim the following:

1. A structure for mounting a raw material hopper on the injection unit of an injection molding machine in such a way that it is possible for the normally horizontally oriented injection unit to be reoriented vertically, for vertical injection, and for the hopper attachment to be converted from its normal configuration in which the hopper is perpendicular to the horizontal plastification cylinder to a configuration in which the hopper is parallel to the vertical plastification cylinder, for a gravity flow of raw material from the hopper into the plastification cylinder in either orientation, the hopper mounting structure, as seen in the normal orientation, comprising in combination:

a mounting hub associated with a rearward portion of the plastification cylinder of the injection unit, the mounting hub having an upwardly facing primary mounting face surrounding a vertical primary charge chute in the form of a bore which leads from the primary mounting face into the plastification cylinder, and the mounting hub further having a secondary mounting face arranged to the rear of the primary mounting face and surrounding a secondary charge chute which is inclined rearwardly from the primary charge chute by an acute angle of at least approximately 45 degrees and leads from the secondary mounting face into the plastification cylinder;

a hopper base formation arranged at the discharge end of the hopper by means of which the hopper is attachable to the primary mounting face of the mounting hub, so that the discharge opening of the hopper is connected to the primary charge chute of the mounting hub; and an adapter post in the form of a straight hollow member, the adapter post having a lower attachment face by which it is attachable to the secondary mounting face of the mounting hub in such a way that its bore forms an inclined adapter chute in communication with the inclined secondary charge chute, the adapter post having an upper attachment face which is inclined to the axis of the adapter post by approximately the same acute angle by which the secondary charge chute is inclined to the primary charge chute, so as to be oriented substantially perpendicularly to the axis of the plastification cylinder, whereby the upper attachment face of the adapter post is capable of serving as a raised horizontal mounting face for the hopper base formation, when the injection unit is reoriented for vertical injection.

2. A hopper mounting structure as defined in claim 1, wherein the plastification cylinder has in its wall a vertical opening in the form of an entry taper through which the raw material enters the plastification cylinder; and the primary and secondary charge chutes in the mounting hub are arranged at an acute angle to each other, forming a chute junction above the entry taper of the plastification cylinder.

3. A hopper mounting structure as defined in claim 2, wherein the primary mounting face of the mounting hub is arranged horizontally and parallel to the plastification cylinder;

the secondary mounting face and the secondary charge chute are inclined rearwardly in relation to the primary mounting face and charge chute by an angle of 45 degrees; and the two bores which serve as the charge chutes have the same diameter, forming said chute junction in a 45-degree intersection whose center is located approximately at the interface between the plastification cylinder and the mounting hub.

4. A hopper mounting structure as defined in claim 3, wherein the adapter post, when attached to the secondary mounting face in the vertical configuration of the injection unit, is oriented at an angle of 45 degrees, having a lower attachment face which is planar to the axis of the adapter post and a horizontal upper attachment face which is inclined to the axis of the adapter post by 45 degrees.

5. A hopper mounting structure as defined in any one of claims 1 through 3, further comprising a chute plug selectively occupying the secondary charge chute in the normal horizontal configuration of the injection unit and the primary charge chute in the reoriented vertical configuration of the injection unit.

6. A hopper mounting structure as defined in claim 2 or claim 3, further comprising a chute plug selectively occupying the secondary charge chute in the normal horizontal configuration of the injection unit and the primary charge chute in the reoriented vertical configuration of the injection unit, and wherein the chute plug extends with its lower extremity into the chute junction, having a gouge in its lower end portion which forms a continuation of the wall of the unoccupied charge chute.

7. A hopper mounting structure as defined in any one of claims 1 through 4, wherein the hopper base formation includes a guide plate of substantially rectangular outline and horizontal orientation which is selectively attachable to the primary mounting face of the mounting hub and to the upper attachment face of the adapter post, the guide plate having a central bore which forms a continuation of the associated primary charge chute or adapter chute, respectively;

the hopper base formation further includes a hopper base with a base flange forming an interior groove profile with which the base flange engages opposite longitudinal edge portions of the guide plate, for sliding engagement therewith; and the hopper base formation further includes means for arresting the hopper base on the guide plate in at least the position in which the hopper is aligned with the associated chute.

8. A hopper mounting structure as defined in claim 7, wherein the guide plate extends in a direction which is transverse to the axis of the plastification cylinder;

the guide plate has a discharge opening at a longitudinal distance from its central bore; and the hopper is movable along the guide plate into alignment with the discharge opening, for discharge of the hopper contents outside the injection unit.

9. A hopper mounting structure as defined in claim 8, wherein the discharge opening of the guide plate is a bore of substantially the same diameter as its central bore; and the distance between the discharge opening and the central bore is at least twice said diameter so that, when the hopper is moved to an intermediate position between the two bores, the guide plate prevents any discharge of raw material from the hopper.

10. A hopper mounting structure as defined in claim 7, wherein the means for arresting the hopper base on the guide plate includes a clamping screw engaging a threaded bore of the hopper base, a clamping lever connected to the clamping screw, and a clamping element interposed between the clamping screw and the guide plate which, when the clamping lever is rotated, creates a frictional arresting action between the guide plate and the hopper base.

* * * * *